J. V. LADDEY.
WIND SHIELD FOR VEHICLES.
APPLICATION FILED JAN. 30, 1908.

910,694.

Patented Jan. 26, 1909.

Witnesses
Edmund O. Duborg
Geo. N. Kerr

Inventor
John V. Laddey
By his Attorneys
Edwards, Sager & Wooster

UNITED STATES PATENT OFFICE.

JOHN V. LADDEY, OF ARLINGTON, NEW JERSEY.

WIND-SHIELD FOR VEHICLES.

No. 910,694.   Specification of Letters Patent.   Patented Jan. 26, 1909.

Application filed January 30, 1908. Serial No. 413,395.

*To all whom it may concern:*

Be it known that I, JOHN V. LADDEY, a citizen of the United States, residing at Arlington, in the county of Hudson and State of New Jersey, have invented certain new and useful Improvements in Wind-Shields for Vehicles, of which the following is a full, clear, and exact specification.

This invention relates to wind shields for vehicles, and has reference to a shield for deflecting the current of air produced by the motion of a vehicle away from the eyes of the driver or other person in the vehicle, whereby the use of glass or other transparent media may be obviated.

The use of glass and other forms of transparent wind shields in vehicles is objectionable because such devices collect rain, snow, dampness, etc., and obscure the view, frequently causing accidents and damage by reason of the imperfect view obtained by the driver. According to this invention, I have provided a deflector which will cause the current of air produced by the motion of the vehicle to be deflected preferably upward in such a direction as to pass over the head of the driver and not into his eyes, thereby permitting glass or transparencies to be dispensed with and permitting a clear view irrespective of the condition of the weather.

The invention is particularly useful on the cabs of locomotives where the best possible facilities for observation are necessary, and likewise is applicable to other vehicles such as automobiles, and also boats, and in all places where observations must be made in the face of strong currents of air.

The invention with reference to several forms thereof is shown in the accompanying drawings, wherein—

Figure 1:
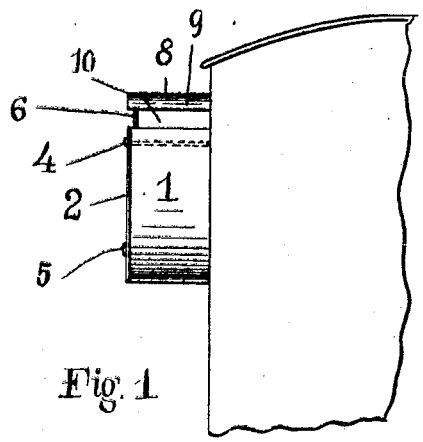
Figure 2:
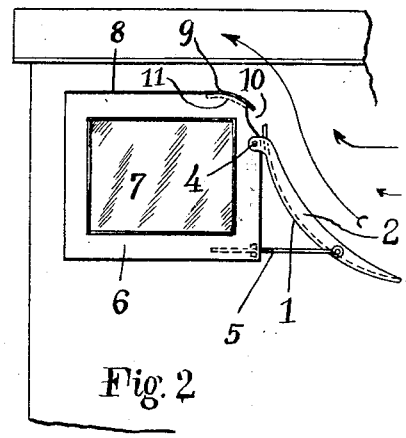

Figure 1 is a front view of an apparatus embodying the invention applied to the cab of a locomotive; Fig. 2 is a side view.

1 represents a curved plate adapted to be supported on a vehicle in any suitable manner and provided with sides 2 for confining the air currents so that after striking the deflector 1 they will be deflected upwardly and rearwardly. The cross section of the deflector 1 may be of various forms, as may also the shape and angle of the sides 2 relatively to the plate 1. The action of such a deflector constructed according to this general principle is to create an upward current of air which will deflect the horizontal air currents which normally would pass over the top of the deflector 1 into an observer's eyes, upwardly and rearwardly. There is thus a space directly above and behind deflector 1 of comparative quiet, no matter how strong the horizontal air currents due to the speed of the vehicle or wind may be. If the eyes of the driver be in this quiet space immediately above and behind the deflector, an unobstructed view can be had without requiring a transparent glass or other medium, and his eyes will not be bothered by the air currents. As herein shown, I have embodied this broad idea of a deflecting shield in an apparatus capable of being applied to a locomotive cab, as shown in Figs. 1 and 2, wherein the deflector 1 is pivoted at 4 so as to be adjustable by means of a rod 5 from within a hood 6, the latter having a side window 7 and a roof 8. The roof 8 may be curved downwardly as at 9 with its lower edge somewhat behind the upper edge of deflector 1 to form the observation space 10, at which no air currents will exist, the air currents being deflected upwardly from the surface of the plate and passing across the aperture 10 and then rearwardly along the roof 8.

11 is a slide mounted under the roof 8 and capable of being moved to vary the width of the aperture 10.

The deflector 1 will be adjusted in position according to the particular conditions of wind velocity or the speed of the vehicle so as to assume a more vertical or horizontal position as may be desired.

By the use of this invention, it will be seen that the necessity for using glass or other transparencies to protect the eyes from wind is avoided, and the observation space above the deflector 1 will not be liable to obstruction, consequently preventing accidents and damage such as have happened where engine drivers have been blinded.

The particular form of deflector and its cross section, size, dimensions, etc., will, of course, be capable of wide variation, according to conditions under which the invention is to be used, and I do not restrict myself to any particular form, shape and dimensions.

Having thus described my invention, I declare that what I claim as new and desire to secure by Letters Patent, is—

1. A wind deflector comprising a curved plate, sides, and a top somewhat above and behind the curved plate and separated from the edge of the plate to form an observation space.

2. A wind deflector comprising a curved plate, sides and a top separated from the edge of the plate to form an observation space, and means whereby the width of the observation space between the edge of the plate and the top can be varied.

3. A wind deflector for a vehicle comprising a support, a curved plate pivoted to said support to be adjustable angularly, and a top above and to the rear of said curved plate, said top and curved plate being separated to form an observation space.

In testimony whereof I affix my signature, in presence of two witnesses.

JOHN V. LADDEY.

Witnesses:
    JULIAN S. WOOSTER,
    GEO. A. HOFFMAN.